United States Patent Office 3,376,158
Patented Apr. 2, 1968

3,376,158
PROCESS FOR PRODUCING MICROPOROUS POLYMERIC STRUCTURES BY FREEZE-COAGULATION OF LATICES
Kenneth R. Buser, Wilmington, Del., assignor to E. I. du Pont de Nemours and Company, Wilmington, Del., a corporation of Delaware
No Drawing. Continuation-in-part of application Ser. No. 341,124, Jan. 29, 1964. This application Mar. 16, 1966, Ser. No. 534,639
11 Claims. (Cl. 117—119.2)

ABSTRACT OF THE DISCLOSURE

A process for preparing vapor permeable microporous polymeric structures from latices which comprises applying a freeze-coagulable polymeric latex to a porous substrate, freezing and coagulating the latex, and drying the resulting product.

---

This application is a continuation-in-part of the copending application Ser. No. 341,124, filed Jan. 29, 1964, now abandoned.

This invention concerns a process for forming microporous polymeric structures from latices, and more particularly, the formation of microporous materials by freeze coagulation of latices.

The term "latex" designates an aqueous dispersion of a water-insoluble polymer which is present in the form of very fine particles.

The term "microporous polymeric structure" in the specification and claims refers to a sheet material of a water vapor permeable polymeric material generally having pores which can not be clearly distinguished by the unaided eye.

Microporous polymeric materials are currently being used as leather replacements in such items as shoes, boots, gloves, clothing, chair coverings and are also being used in such things as ink pads, paint rollers, battery separators, filter media, synthetic biological membranes and bearing materials. Vapor permeable polymeric films and coatings have been prepared by a variety of methods, but there is a need for an improved procedure.

Permeable structures have been prepared by applying polymeric coatings to porous substrates followed by piercing the coatings in a conventional needle loom. This procedure leaves visible holes in the coating which make it unsuitable for many purposes, particularly as lether replacement, since the visible pores detract from the appearance of the product. Permeable products have also been made from impregnated non-woven fibrous batts by perferentially extracting one of the components of the polymeric coating or film or by forming pores in the polymeric film or coating with blowing agents. Procedures such as these are generally complicated and time consuming and usually yield structures which have visible pores or pores which are non-uniform in nature and often form products which have a poor tensile strength and poor tactile properties.

An improved process for forming microporous films and coatings is disclosed in U.S. Patent 3,100,721 to E. K. Holden. Holden's process employs a wide spectrum of polymers and yields structures which improved microporous characteristics free from the undesirable characteristics present in prior art structures. Holden's process involves coagulation of polymeric materials from a mixture of miscible and immisicible solvents, but systems such as these are expensive and are difficult to operate; also, the removal of residual solvent from the coagulated polymer is often very difficult.

The process of this invention for making microporous polymeric structures eliminates the disadvantages of the prior processes and provides a product which is microporous and highly permeable to water vapor. This invention uses a wide spectrum of polymers to yield products of an improved microporous character for making unplasticized leather replacements having excellent tactile and tensile properties.

It is well known that lactices can be coagulated by freezing; for example, freeze coagulation is used in the manufacture of poly(chloroprene) rubber. The process of this invention is concerned with forming a vapor permeable microporous material by applying a freeze-coagulable polymeric latex to a porous flexible substrate.

After the latex is applied to the substrate, it is subjected to a temperature of less than $-10°$ C. and coagulated. The frozen coagulated sheet is then dried and a product having a microporous structure results. The freeze-coagulable polymeric latex used in this process has a polymer solids content of about 10-70% and the polymer has a secant modulus at 5% elongation above 75 pounds per square inch (p.s.i.) determined by the method of ASTM D–882–64–T.

By "freeze-coagulable polymeric latex" is meant an aqueous dispersion of finely divided water-insoluble polymer particles of either a natural or a synthetic polymer from which the polymer is irreversibly deposited upon freezing. To determine whether or not a latex is freeze-coagulable, the latex is frozen to a solid state and reheated to room temperature. If the latex remains coagulated and does not return to a dispersion, then it is useful for this invention if the latex polymer has the aforementioned secant modulus.

A wide variety of polymers can be used in the process of this invention; however, the physical properties of the polymer must be such that (1) it is capable of being formed into a latex, (2) it is freeze-coagulable, and (3) it retains the microporous structure after the sheet is dried.

In addition to the above general polymer properties, polymers that form latices useful in this invention are required to have a secant modules at 5% elongation above 75 p.s.i., preferably 100–300 p.s.i., and more preferably, about 130–1000 p.s.i. The secant modules is the ratio of the stress to the strain at 5% elongation of the sample determined from the stress-strain curve and is expressed in force per unit area, i.e., pounds per square inch. The secant modulus measurement is carried out according to ASTM D–882–64–T which provides a detailed description of the test procedure.

The secant modulus of the polymer of a latex to be used in this invention is determined on the polymer which is in the same state as it is in the final product; for example, if a natural rubber latex is to be used in the process, the secant modulus on the rubber is measured after the natural rubber has been vulcanized since in the final product, the natural rubber is in a vulcanized state. In general, only those polymeric latices that coalesce upon drying at about 10–100° C. are useful in this invention.

The secant modulus of a latex polymer is determined by forming a 5 to 15 mil continuous void-free polymer film from the polymeric latex used in the process of this invention. The film is formed by coating the polymeric latex, as is to be used in the process, on a glass plate. The latex is then dried. If the latex in the final microporous product formed by the process of this invention is cured, then the test sample is also cured before or after drying. The latex polymer that is to be tested should be in the same form as the polymer will be in the final product, i.e., if the polymer of the final product is cured, the test sample should also be cured.

The stress-strain curve which is necessary to calculate the secant modulus of the latex polymer is preferably obtained on an Instron Tensile Tester using a ½ inch wide sample of the above prepared polymeric film with about one inch between grips. The following settings are preferably used on the Instron Tester to obtain a stress-strain curve: chart speed of 10 inches per minute, cross head speed of 1 inch per minute, and a full scale load of 2 or 5 pounds.

The secant modulus is obtained from the chart of the force strain curve by drawing a line at 5% sample elongation (strain) parallel to the stress axis of chart. The point at which this line intersects the force strain curve is determined and the force in pounds necessary to elongate the sample 5% is obtained. This force value is divided by the cross-sectional area of the sample to give the corresponding stress value in pounds per square inch. This stress value is divided by the strain (0.05 on a 1 inch sample) to give the secant modulus.

The amount of polymeric solids in the latices useful in this invention is about 10–75% by weight with the preferred range being about 30–60% by weight solids. Use of latices with less than 10% solids usually produces products which are not microporous throughout but contains macropores that are often noticeable and unsightly, thereby making the product unsuitable as a high quality leather replacement. Latices having a solids concentration within the aforementioned range produce microporous structures which have uniform pore size within the range of about 0.1–50 microns and are products that generally have an adequate water vapor permeability value and an excellent appearance.

Latices useful in the process of this invention are formed from a wide variety of polymers that have the aforementioned physical characteristics. Preferably, vinyl addition polymers formed from monomer units having 2–12 carbon atoms per monomer unit that have a secant modulus above 75 p.s.i. are used to form latices useful in this invention. Particularly useful in this invention are latices of low modulus elastomers, and more particularly, those polymers that have a secant modulus of about 130–700 p.s.i., such as natural rubber (polyisoprene); neoprene (polychloroprene); butyl rubber; polymer of monomeric units about 1–5% by weight of α,β-unsaturated monovinylidene monocarboxylic acid, about 10–50% by weight acrylonitrile and about 89–35% by weight of a conjugated diene having 4–6 carbon atoms, such as a polymer of monomeric units of acrylic acid/acrylonitrile/butadiene; and polymer of monomeric units of about 1–5% by weight α,β-unsaturated monovinylidene monocarboxylic acid, 10–60% styrene, and about 89–35% by weight of a conjugated diene having 4–6 carbon atoms, such as a polymer of monomeric units of acrylic acid/styrene/butadiene.

Latices of thermoplastic polymers are also useful, such as latices of acrylate polymers and soft methacrylate polymers, as well as various mixtures of these latices and mixtures of these latices with the above natural or synthetic elastomeric latices. Latices of polyurethane polymers can also be used. Blends of the following polymerizable compounds form latices useful in this invention: alkyl esters of acrylic and methacrylic acid in which the alkyl group contains 1–12 carbon atoms; conjugated dienes having 4–10 carbon atoms, such as butadiene; olefins, such as ethylene; acrylonitrile; styrene; alkyl-substituted styrene; vinyl acetate; and dibutyl maleate.

The latex is applied to a porous flexible substrate by standard methods such as dipping, spray coating, knife-coating, roller coating, casting or brushing. Porous flexible substrates which are readily impregnated or coated by the process of this invention are wovens, twills, drills, and ducks; jersey, tricot and knitted materials; felts, and needle punched batts. The choice of the particular fibers from which the substrate is made is not critical; included are those made from polyamides, polyesters, polyesteramides, acrylic polymers, viscose rayon, wool, cotton, glass and mixtures thereof. Elastomeric fibers, elastic fibers can also be used and in some instances it might be desirable to use a paper substrate. One preferred substrate which is useful in forming a leather replacement for shoe upper material is a porous, non-woven, needle punched heat shrunk batt of polyethylene terephthalate fibers.

It is often desirable to apply topcoatings of latices by the process of this invention to porous substrates, that have been impregnated by the process of this invention or by other processes, to form a leather-like product. The thickness of the dried coating should be about 3–90 mils with the preferred thickness being about 5–20 mils. Generally, coatings less than 3 mils thick do not provide adequate protection to substrate and if scuffed will expose the substrate. Coatings of greater than 90 mils usually do not have an adequate water vapor permeability value.

Substrates of porous batts impregnated with synthetic resins, such as styrene/butadiene, acrylic/vinyl halide or polyurethane polymers can be topcoated by the process of this invention. The fibers from which these impregnated substrates are made are not critical and can be formed from any of the aforementioned polymers.

One particularly preferred sheet material which can be topcoated by the process of this invention to form a leather-like product is a non-woven, needle punched, heat shrunk batt of polyethylene terephthalate fibers impregnated with a mixture of up to 50% by weight of a vinyl polymer, preferably poly(vinyl chloride), and at least 50% by weight of a polyurethane polymer. The polyurethane polymer is preferably chain-extended with a mixture of about 80 mole percent hydrazine and 20 mole percent N-methylamino-bis-propylamine. The preferred structure contains about 30–60% polyethylene terephthalate fibers by weight and about 70–40% by weight of the above microporous polyurethane-poly(vinyl chloride) polymer mixture.

It is possible to form unsupported films by the process process of this invention, and the latex polymer can be reinforced by fibrous additives to improve tear and tensile strength. The films are usually cast on a glass or a stainless steel support which allows the film to be easily released, particularly when the support is pretreated with a releasing agent, such as wax.

Often it is desirable to add a fibrous material to the latex polymer used in the process of this invention to reinforce the polymer after coagulation. The following fibrous additives can be used in the amount from about 1–60% by weight based on the weight of polymer to increase tear and tensile strength of the coagulated polymeric structure: wood cellulose fibers, such as paper pulp and wood fluff; inorganic fibers of glass, asbestos, metals, synthetic amphiboles; and natural staple fibers, such as cotton linters, cotton floc, flax, hemp and the like; synthetic staple fibers of polyesters, polyamides, polyethylene, polypropylene, polyesteramides, polyurethanes, polyurea, polyacrylonitrile, poly(vinyl chloride) and the like can be used. Fibrids, which are non-rigid wholly synthetic polymeric particles which have at least one dimension of a minor magnitude relative to their largest dimension and are capable of forming paper-like structures when deposited from a slurry onto a membrane of a paper-making apparatus (see Belgian Patent 564,026), can also be added to the latex polymer. Sufficient amounts of the aforementioned fibrous additives make it possible to cast an unsupported film which may be used as a leather replacement.

Often it is necessary to add thickening agents to a latex which is to be applied as a topcoating by the process of this invention to give the desirable operating viscosity. The useful viscosity range for the latices applied as topcoatings is about ½–200 poises with the preferred range being about 10–40 poises. Thickening agents most commonly used are ammonium caseinate, ammonium alginate, methyl cellulose (25 cps. to 50,000 cps. viscosity, measured as a 2% aqueous solution at 25° C.) and sodium polyacrylate. Other thickening agents, such as polyacrylic acids, polyvinyl alcohol, carboxymethyl cellulose, polyvinyl pyrrolidone, maleic acid copolymers, gelatine, and the like can also be used. It is desirable, but not absolutely necessary, to remove the thickener from the latex after it has been coagulated; this is accomplished by washing the coagulated latex with water. If the thickener is retained in the sheet, subsequent rewetting of the material causes the thickener to come to the surface and makes the material feel slimy. This washing step may be eliminated from the process by cross-linking and insolubilizing the thickener and can be accomplished by adding a cross-linking agent such as polyacrylamide and an agent which insolubilizes the thickener, such as bis-hydroxy methyl urea. The subsequent drying and curing of the polymer after coagulation at an elevated temperature aid in the cross-linking and insolubilization of the thickener.

After the latex is applied to a substrate, it is then coagulated by freezing. The latex is freeze-coagulated at a temperature range below −10° C., preferably −20 to −75° C. If the latex is applied as a topcoating, it should be coagulated at a rapid rate to assure a uniform microporous structure, i.e., the latex coating should be cooled rapidly. The rate at which the latex coating is freeze-coagulated is important since it greatly affects the pore size. If slow freezing rates are used, large ice crystals within the polymer usually result in a non-uniform pore size and often visible macropores are formed within the structure giving the product an unattractive appearance. In general, the more rapid the freezing rate, the smaller and more homogeneous the pore structure of the material becomes. However, too rapid a freezing rate results in extremely small ice crystals that form very small pores which will collapse on drying. For this reason, temperature below −100° C. are generally not considered useful since the freezing rate of the latex is too rapid and often results in pore collapse. One skilled in the art through simple experimentation will have little difficulty in determining an adequate freezing rate which will give a microporous product which dose not collapse on drying.

After coagulation, the latex is dried, preferably at a temperature of about 30–150° C., for about 2 hours. However, it is possible to dry the product at a lower temperature, for example, room temperature about 22° C., in a longer period of time. One preferred method for curable polymer, such as natural rubber, is to heat the coagulated latex structure in a steam bath for about 30 minutes and then dry the cured latex at about 40–130° C. for about 30–60 minutes which will complete the curing of the latex as it is dried.

It is possible to use the process of this invention in a continuous or a batch process. In a continuous process, the latex polymer is applied to a substrate which is continuously passed into a freezing unit to coagulate the latex; then the sheet is cured, if necessary, and dried. In a batch process, the latex is applied to the substrate, then the sheet is frozen in another separate step and thirdly, the sheet is cured, if necessary, and dried.

The microporous polymer material is used primarily as a leather replacement in boots, shoes, gloves, etc., and should be permeable to water vapor. Based on comfort tests, the minimum water vapor permeability is about 2,000 grams/100 sq.meters/hour with the preferred permeability range being about 4,000–20,000.

These permeability values, hereinafter referred to as PV, are based on the test method of the Bureau of Standards, Kanagy and Vickers, J. Rest. Nat. Bureau of Standards, 44, 347–62, 1950 (April), which is conducted in an atmosphere at 23° C. and 90% relative humidity. However, in some instances, particularly in the manufacture of women's shoes, it is possible to use material with a much lower vapor permeability value.

The following examples illustrate the invention. All parts and percentages are by weight unless otherwise specified.

Example 1

A latex coating composition is prepared by compounding the following ingredients:

64.5 parts by weight of an aqueous latex of neoprene containing about 50% non-volatile ingredient which is described in Example 1, Part A, of French Patent 1,289,-754; 24.2 parts by weight "Geon" 351 vinyl chloride polymer in about a 57% aqueous dispersion; 2.1 parts by weight of 33% aqueous dispersion of 2,2-methylene-bis-(6-tertiary butyl paracresol); 3.6 parts by weight zinc oxide in a 50% aqueous dispersion; 3.2 parts by weight of "Aquarex SMO" which is an aqueous dispersion of 33% of a sodium salt of sulphated methyl oleate; 0.7 part by weight of "Tepidone" which is a 50% aqueous dispersion of sodium butyl dithiocarbamate; and 0.7 part by weight of a 33% aqueous dispersion of thiocarbanalide.

The secant modulus at 5% elongation is determined on the above latex by coating about a 20 mil thick wet film on a glass plate and then drying the film. The dried film is about 10 mils thick and is then cured for one hour at about 90° C. and a ½ inch wide sample is cut from the dried film and placed in an Instron Tensile Tester. The following settings are used on the Instron Tester: chart speed of 10 inches per minute; cross head speed of 1 inch per minute; full scale load of 2 pounds and test sample length of 1 inch between bench marks.

The secant modulus at 5% elongation is determined from the stress-strain curve by measuring the force in pounds at 5% sample elongation and dividing this value by the strain and cross-section area of the test sample. The secant modulus value calculated for the above latex polymer is about 1150 pounds per square inch.

The above prepared coating composition is diluted with distilled water to about a 37% by weight solids aqueous dispersion and is knife-cast as a 20 mil wet film on a woven cotton cloth which is taped to a glass panel. The cotton cloth weight is about 2.5 ounces/square yard, has a count of 122/118 and a grab tensile of 50/40 pounds/inch and an elongation at break of 16%/15%. The glass panel with the latex coating cloth is then placed on Dry Ice which is about −70° C. The latex coated cloth is thoroughly frozen for about 30 minutes and then removed from the glass plate and thawed. The film is then washed for about 2 hours in running water to remove all the water extractibles. The cloth is then dried at room temperature for about 72 hours and then is cured for 1 hour at about 90° C. Total thickness of the dried sheet is about 24 mils.

The permeability value (PV) of the resulting coated material is determined by filling a 3" diameter crystallizing dish with 12 mesh calcium chloride, covering the dish with the coated material and placing the dish into an atmosphere of high humidity (23° C. and 90% relative humidity). This assembly is weighed at intervals and the equilibrium rate of absorption is recorded as grams of water per 100 square meters of surface area per hour, which is a commonly used permeability value. This is a modification of the test developed by the Bureau of Standards, Kanagy and Vickers, J. Res. Nat. Bureau of Standards, 44, 347–62, 1960 (April). The PV after curing of the sample is about 6800.

The microporous polymeric coating on the cloth is uniformly microporous, has a leather-like appearance, and good tactile properties.

Example 2

| | Parts solids by wt. |
|---|---|
| Natural Rubber Latex (66% rubber solids latex, of a polyisoprene elastomer obtained from the *Hevea brasiliensis* tree) | 100 |
| "Aquarex" SMO (10% aqueous solution of the sodium salt of sulfated methyl oleate) | 2 |
| Zinc Oxide (50% aqueous dispersion) | 8 |
| "Santowhite" crystals (40% aqueous dispersion of 4,4'-thiobis-(6-tert-butyl-m-cresol)) | 2 |
| "Butyl Zimate" (33% aqueous dispersion of zinc dibutyl dithiocarbamate) | 2 |
| DPG (33% aqueous dispersion of diphenylguanidine) | 2 |
| Sulphur (50% aqueous dispersion) | 1.5 |
| Total solids | 117.5 |

The above ingredients are blended together and the mixture is diluted with water to form a latex having a 16% polymer solids content. The secant modulus of the polymer of the coating composition is determined by forming a 10 mil thick void-free dry film from the above prepared latex and curing the film in steam at 100° C. for 30 minutes and then air drying the film. The secant modulus at 5% elongation of the polymeric film, determined by the procedure set forth in Example 1, is about 300 pounds per square inch.

A 50 mil thick porous non-woven web of heat-shrunk polyethylene terephthalate fibers is immersed in the above prepared latex. Excess latex is removed from the web and the impregnated web is placed between two ¼ inch thick aluminum plates and the assembly is immersed in Dry Ice for about 30 minutes to freeze and coagulate the latex in the web. The web is removed from the Dry Ice and immersed in 50° C. water for about 5 minutes to thaw the web and the thawed web is then placed in a steam bath at 100° C. for about 30 minutes to vulcanize the rubber. The web is then washed with water and dried for 1 hour at 100° C.

The resulting impregnated web is soft and flexible and has a microporous polymeric structure and has the following physical properties:

| | |
|---|---|
| Binder to fiber ratio | 0.78 |
| Water vapor permeability value (g./100 m.²/hr.) | 13,000 |
| Density (g./cc.) | 0.38 |
| Tensile strength at break (p.s.i.), M/T | 1250/730 |
| Elongation at break, percent, M/T | 130/200 |

(M/T=Machine direction/transverse direction of the substrate).

Example 3

A latex is formed using the ingredients as in Example 2 with the exception that the following ingredients are added: an additional 1.5 parts by weight solids of sulfur and 2 parts by weight solids of a 5% aqueous solution of methyl cellulose having a viscosity of 25 centipoise, measured as a 2% aqueous solution at 20° C.

After the above ingredients are blended, the latex is diluted with water to a 39% by weight polymer solids content. The secant modulus on the latex polymer at 5% elongation, determined as in Example 2 is about 300 p.s.i.

A 30 mil wet film is knife-coated onto the impregnated non-woven web prepared in Example 2. The coated web is placed on an aluminum plate and the latex coating frozen to a solid state by placing the assembly in Dry Ice which is at about −70° C. for 20 minutes. The frozen coated substrate is thawed by placing the substrate in a water bath at about 50° C. for about 5 minutes. Next the coated substrate is placed in a steam bath at 100° C. for 30 minutes to cure the polymer and then dried at room temperature.

A product results having a soft, smooth, white, microporous, elastomeric coating with an excellent appearance which is useful as a leather replacement. The moisture permeability of the coated substrate is about 8000 gram/100 m.²/hour, and the averagte pore diameter of the coating as measured by the mercury intrusion method, described in a paper by N. M. Windsor and J. S. Shapiro in the ASTM Bulletin of February, 1959, is about 12.5 microns.

Example 4

| | Parts solids by wt. |
|---|---|
| Carboxylic polymer latex (42.6 of polymer solids latex of the copolymerization product of 69 parts butadiene, 26.5 parts acrylonitrile, 4.5 parts methacrylic acid) | 100 |
| Zinc oxide (50% aqueous dispersion) | 5 |
| "Santowhite" crystals (40% aqueous dispersion of 4,4'-thiobis-(6-tert-butyl-m-cresol)) | 2 |
| "Aquarex" SMO (33% aqueous solution of the sodium salt of sulfated methyl oleate) | 1 |
| Total solids | 108 |

The above ingredients are blended together into a mixture which is diluted with water to form a latex having a 16% polymer solids content. The secant modulus of the latex polymer is determined by forming a 10 mil thick film from the above latex and curing and drying the film at about 120° C. in a circulating air oven. The secant modulus at 5% elongation of the polymeric film, determined by the procedure set forth in Example 1, is about 340 p.s.i.

A 50 mil thick porous non-woven web of heat-shrunk polyethylene terephthalate fibers is immersed in the above prepared latex. Excess latex is removed from the web and the impregnated web is placed between two ¼ inch thick aluminum plates and the assembly is immersed in Dry Ice for about 30 minutes to freeze and coagulate the latex in the web. The web is removed from the Dry Ice and immersed in 50° C. water for about 5 minutes to thaw the web and the thawed web is then placed in a circulating air oven at 120° C. for 45 minutes which cures the polymer and dries the web. The resulting impregnated web is soft and flexible and has a microporous polymeric structure.

A topcoating is formed by using the same ingredient as used in the latex above with the exception of the addition of 1 part by weigh solids of a thickener of a 2% aqueous solution of ammonium alginate. These ingredients are blended together and diluted with water to form a topcoating composition having a 30% polymer solids content.

A 30 mil wet film is knife-coated onto the above prepared impregnated non-woven web and this web is placed on an aluminum plate. The topcoating is freeze-coagulated by placing the plate and web on Dry Ice, then the web is thawed and washed using the above procedure. The topcoated product is cured and dried in a 100° C. circulating air oven for a 15 minute period. The resulting product has a soft, smooth, white, microporous, elastomeric coating and an excellent appearance and is useful as a leather replacement. The moisture permeability value of the resulting product is about 6900 g./100 m.²/hr.

Example 5

A latex is prepared by blending 50 grams of a carboxylic polymer latex (25% polymer solids by weight in which the polymer is the reaction product of 55 parts of styrene, 44 parts butadiene and 1 part of acrylic acid) with 3 grams of a 10% aqueous ammonium caseinate and then by diluting the blend with water to about a 30% solids content. The secant modulus of the polymer is determined by forming a 10 mil thick film from the above latex and curing and drying the film at about 100° C. in a circulating air oven. The secant modulus at 5% elongation of the polymeric film, determined by the procedure set forth in Example 1, is about 130 p.s.i.

A 50 mil thick porous non-woven web of heat shrunk polyethylene terephthalate fibers impregnated with a microporous polyurethane polymer is knife-coated with a 25 mil thick film of the above prepared latex. The topcoated web is placed on a ⅛ inch glass plate and this assembly is placed on Dry Ice for about 30 minutes to freeze and coagulate the latex on the web. The web is removed from the Dry Ice and immersed in 50° C. water for about 5 minutes to thaw the web and the thawed web is then dried. The resulting topcoated impregnated web is soft and flexible and has a microporous structure and a moisture permeability value of about 10,500 gr./100 m.²/hour and is useful as a leather replacement product.

I claim:

1. In the process for freeze-coagulating a polymeric latex the improvement in combination therewith for preparing a microporous polymeric water vapor permeable sheet material consisting essentially of
   (A) applying a freeze-coagulable polymeric latex to a preshrunken porous flexible fiberous substrate;
   (B) freezing and coagulating the polymeric latex into a microporous polymeric structure at a temperature lower than −10° C.; and
   (C) drying the resulting product, said polymeric latex containing about 10–75% solids of a polymer having a secant modulus at 5% elongation of above 75 pounds per square inch as determined by the method of ASTM D–882–64–T.

2. The process of claim 1 in which the freezing temperature is less than −10° C. and the polymer is a vinyl addition polymer consisting essentially of monomer units having 2–12 carbon atoms and having a secant modulus at 5% elongation of 100–3000 pounds per square inch.

3. The process of claim 2 in which the porous flexible substrate is a non-woven web.

4. The process of claim 2 in which a 3 to 90 mil thick coating of a polymeric latex is applied to a polymer impregnated flexible porous fibrous substrate and coagulated at a temperature of less than −20° C. to form a microporous leather-like product.

5. Process of claim 4 in which the flexible porous substrate comprises a non-woven web of polyethylene terephthalate fibers impregnated with a microporous polyurethane polymer.

6. Process of claim 4 wherein the substrate comprises a non-woven web of polyethylene terephthalate fibers impregnated with a polymer blend comprising at least 50% by weight of a microporous polyurethane polymer and up to 50% by weight of a vinyl chloride polymer.

7. The process of claim 2 in which steps (1), (2), and (3) below are performed after step (B) and before step (C);
   (1) reducing the water content of said substrate;
   (2) applying a 3 to 90 mil thick film of a latex having a 30–75% polymer solids content to said substrate, the polymer of said latex having a secant modulus at 5% elongation of 100–3000 pounds per square inch;
   (3) freezing and coagulating the latex applied in step (2) above at a temperature of less than about −20° C. to form a microporous topcoat structure.

8. In the process for freeze-coagulating a latex the improvement in combination therewith for preparing a microporous polymeric water vapor permeable sheet material consisting essentially of
   (A) applying a freeze-coagulable polymeric latex to a preshrunken porous flexible fibrous substrate;
   (B) freezing and coagulating the polymeric latex into a microporous polymeric structure at a temperature of −10° C. to −100° C.;
   (C) curing the coagulated latex by heating to about 50–150° C.; and
   (D) drying the resulting product, said polymeric latex containing about 10–75% polymer solids; said polymer consisting essentially of natural rubber.

9. In the process for freeze-coagulating a latex the improvement in combination therewith for preparing a microporous polymeric water vapor permeable sheet material consisting essentially of
   (A) applying a freeze-coagulable polymeric latex to a porous preshrunken flexible fibrous substrate;
   (B) freezing and coagulating the polymeric latex into a microporous polymeric structure at a temperature of −10° C. to −100° C.;
   (C) thawing said coagulated polymeric latex; and
   (D) drying the resulting product, said polymeric latex containing about 10–75% polymer solids, said polymer consisting essentially of the reaction product of monomeric units of an α,β-unsaturated monovinylidene monocarboxylic acid, a conjugated diene having 4–6 carbon atoms and acrylonitrile.

10. In the process for freeze-coagulating a latex the improvement in combination therewith for preparing a microporous polymeric water vapor permeable sheet material consisting essentially of
    (A) applying a freeze-coagulable polymeric latex to a porous preshrunken flexible fibrous substrate;
    (B) freezing and coagulating the polymeric latex into a microporous polymeric structure at a temperature of −10° C. to −100° C.;
    (C) thawing said coagulated polymeric latex; and
    (D) drying the resulting product, said polymeric latex containing about 10–75% polymeric solids, said polymer consisting essentially of neoprene.

11. In the process for freeze-coagulating a latex the improvement in combination therewith for preparing a microporous polymeric water vapor permeable sheet material consisting essentially of
    (A) applying a freeze-coagulable polymeric latex to a preshrunken porous flexible fibrous substrate;
    (B) freezing and coagulating the polymeric latex into a microporous polymeric structure at a temperature of −10° C. to −100° C.;
    (C) thawing said coagulated polymeric latex; and
    (D) drying the resulting product, said polymeric latex containing about 10–75% polymer solids, said polymer consisting essentially of the reaction product of monomeric units of an α,β-unsaturated monovinylidene monocarboxylic acid, styrene, and a conjugated diene having 4–6 carbon atoms.

References Cited

UNITED STATES PATENTS

| | | | |
|---|---|---|---|
| 2,037,130 | 4/1936 | Hill | 117—119.2 |
| 2,187,146 | 1/1940 | Calcott et al. | 264—28 |
| 2,396,907 | 3/1946 | Wolk et al. | 260—85.1 |
| 3,185,582 | 5/1965 | Alegre | 117—76 X |
| 3,228,786 | 1/1966 | Fitzgerald et al. | 117—76 X |

MURRAY KATZ, *Primary Examiner.*

WILLIAM D. MARTIN, *Examiner.*

R. HUSACK, *Assistant Examiner.*